United States Patent
Cole et al.

[15] 3,707,056
[45] Dec. 26, 1972

[54] DECOMPOSABLE POLYOLEFIN AGRICULTURAL MULCH

[72] Inventors: Edward L. Cole, Fishkill; Howard V. Hess, Glenham; Renato C. Pomatti, Beacon, all of N.Y.

[73] Assignee: Texaco Inc., New York, N.Y.

[22] Filed: May 10, 1971

[21] Appl. No.: 142,028

Related U.S. Application Data

[63] Continuation-in-part of Ser. Nos. 833,138, June 13, 1969, abandoned, and Ser. No. 883,339, Dec. 8, 1969, and Ser. No. 23,501, March 27, 1970, which is a continuation-in-part of Ser. No. 611,233, Jan. 24, 1967, abandoned.

[52] U.S. Cl. ............... 47/9, 260/41 C, 260/93.7, 260/94.9 GD, 260/DIG. 43
[51] Int. Cl. ................................................. A01g 7/00
[58] Field of Search... 260/41 C, 93.7, 94.9 GD, DIG. 43; 47/9

[56] References Cited

UNITED STATES PATENTS

| | | | |
|---|---|---|---|
| 3,274,731 | 9/1966 | Vigneault et al. | 47/9 |
| 3,299,568 | 1/1967 | Tobolsky et al. | 47/9 |
| 3,320,695 | 5/1967 | Moore | 47/9 |
| 3,341,357 | 9/1967 | Feild | 47/9 X |
| 3,345,773 | 10/1967 | Sturgess et al. | 47/9 |
| 3,454,510 | 7/1969 | Newland et al. | 47/9 X |
| 3,590,528 | 7/1971 | Shepherd | 47/9 |
| 3,592,792 | 7/1971 | Newland et al. | 47/9 |

*Primary Examiner*—Robert E. Bagwill
*Attorney*—Thomas H. Whaley and Carl G. Ries

[57] ABSTRACT

The decomposition rate of polyolefin film used as an agricultural mulch is controlled by the incorporation therein of 3 to 20 percent of a cation exchanged sulfonated petroleum coke or cation exchanged wet air oxidized petroleum coke. The film also contributes ion exchange capacity to the soil, furnishes nutrients and improves the tilth of the soil. Other additives such as nematocides or fungicides can be incorporated in the film mulch.

10 Claims, No Drawings

DECOMPOSABLE POLYOLEFIN AGRICULTURAL MULCH

CROSS-REFERENCE TO COPENDING APPLICATIONS

This application is a continuation-in-part application of commonly assigned copending applications, Ser. No. 833,138, filed June 13, 1969, and now abandoned; Ser. No. 883,339, filed Dec. 8, 1969 and Ser. No. 23,501 filed Mar. 27, 1970, itself a continuation-in-part of Ser. No. 611,233, filed Jan. 24, 1967 and now abandoned.

This invention relates to a novel polyolefin film formulation having incorporated therein means for controlling, and, in particular, for accelerating its decomposition rate so as to render it more useful as an agricultural mulch.

The use of such films as an agricultural mulch in the place of leaves, straw or other loose materials to prevent evaporation of water from the soil, for weed and soil temperature control, has been increasing over the years. While such use is satisfactory for its intended purposes, the subsequent disposal of the film is a serious problem which has not yet been satisfactorily resolved. Currently, polyethylene film used as an agricultural mulch is collected and burned after it has served its purpose. Obviously these two operations increase considerably cultivation costs, increase air pollution and, therefore, it would be desirable to eliminate them.

Accordingly, the main object of our invention is to provide a degradable polyolefin film which need not be removed from cultivated areas and can be tilled into the ground after it has served its purpose as a mulch.

An equally important object of our invention is to provide a tailor-made polyolefin film for use as an agricultural mulch and which is able to degrade in a more or less specific length of time depending upon where it is used and the ambient climatic conditions prevailing in the region.

Still another object of the present invention is to provide polyethylene film useful as agricultural mulch and as a means for enriching the soil where it is used owing to the incorporation therein of micronutrients.

Another important object of the claimed invention is to provide a low density polyethylene film made black by the incorporation therein of enough cation-exchanged sulfonated or oxidized coke to absorb heat from the sun with the result that the film and the soil are heated.

Other objects of the invention will in part be obvious and in part hereinafter pointed out.

In accordance with the invention, polyolefin films are more degradable by the incorporation therein of at least one of the following additives: cation-exchanged sulfonated coke or cation-exchanged wet air oxidized coke. The amount of coke in the polyolefin ranges from about 0.1 to about 40 percent by weight of the blend, but preferably is about 1 to about 20 percent by weight.

Single and multi-cation-exchanged sulfonated cokes suitable for use in the present invention are made by the process of copending application Ser. No. 23,507, filed Mar. 27, 1970. This process comprises the steps of contacting one part by weight of finely divided petroleum coke with about 0.5 to 7 parts by weight of a sulfonating agent at a temperature in the range of about 150° to 250° F to produce water-insoluble sulfonated petroleum coke; washing the sulfonated petroleum coke until substantially free of sulfate ions; contacting said washed sulfonated petroleum coke or the alkali metal salt thereof with at least one dilute aqueous solution containing at least one cation from the group of cations consisting of copper, iron, manganese, zinc, cobalt, and mixtures thereof effecting ion exchange. Additionally, other materials as, for example, the cations of magnesium, molybdenum and ammonia may be co-exchanged.

Cation-exchanged wet air oxidized coke suitable for use in the present invention is made by the process of copending application Ser. No. 883,339, filed Dec. 8, 1969.

The petroleum coke used as a starting material in that process can be produced by the "delayed coking" process — a special process for converting heavy residual fuel oil into gasoline, gas oil, and coke. Other petroleum coking processes may be used if they produce a petroleum coke having a similar structure and chemical analysis. In the "delayed coking" process, reduced crude oil is charged into the base of a fractionating tower. Tower bottoms and a predetermined recycle stream are withdrawn and heated to a temperature of 900°–950° F. By delayed residence in a coke drum, the petroleum coke builds up at a temperature of 850°–950° F and a pressure of 10–100 psi. The petroleum coke is then cooled with water and removed from the delayed coker by hydraulic jet. The coke particles are quite hard and abrasive, and may contain sufficient oils to make them "tacky." Petroleum coke generally has the following composition by weight: from about 0 to about 0.5 percent moisture, from about 1 to about 15 percent volatiles, from about 85 to about 95 percent fixed carbon, from about 0.2 to about 1.3 percent ash, and from about 1 to about 5 percent sulfur.

The wet air oxidized coke intermediate is in general prepared by contacting the petroleum coke with oxygen, including air and activated oxygen, preferably air, in the presence of water including compounds which generate water during the course of the reaction, in general at temperatures of from about 600° F to about 1,000° F, more preferably from about 650° F to about 850° F, at pressures of from about atmospheric to about 100 psig, more preferably from about atmospheric to about 10 psig. It is preferred in carrying out the oxidation step to utilize air wherein the air is saturated with water at a saturation temperature of from about 50° to about 210° F, more preferably from about 100° to about 180° F. In general, the concentration of water which is utilized in carrying out the process of this invention is dependent upon the gas rate which is utilized during the oxidation step. Thus concentrations of water in the oxygen containing gas is in general from about 0.04 weight percent to about 70 weight percent, more preferably from about 0.05 weight percent to about 40 weight percent. The hourly gas rate which is utilized including both air and water that is saturated with air is in general from about 0.25 to about 0.75, more preferably from about 0.40 to about 0.60 based upon the weight of the petroleum coke. The treating time will be from about 1 to 30 hours and more preferably from 4 to 12 hours at the above gas rates. In general, the yields which are obtained upon oxidation of the petroleum coke are at least about 50 percent, more preferably about 70 to 90 percent by weight. It is contemplated within the scope of this invention that the oxidation of petroleum coke can be carried out in the presence of a catalyst such as a vanadium catalyst. However, it is preferred to carry out such oxidation in the absence of a catalyst although the use of the term "oxidizing a petroleum coke" includes both the oxidation in the presence and absence of a catalyst.

The exchange capacity of the oxidized petroleum coke expressed as milliequivalents per gram of oxidized coke is represented by the sum of the weak acid and chelating sites.

The number of carboxyl groups in the oxidized coke may be determined by passing a 1N ($CH_3COO_2$) Ca solution over the oxidized coke followed by titrating the filtrate with 0.1N KOH solution.

The cation exchange derivative of oxidized petroleum coke may be made by contacting the coke with the desired cations in an amount sufficient to combine from about 0.05 to about 5 percent by weight, more preferably from about 0.1 to about 2 weight percent and still more preferably from about 0.1 to about 1.0 weight percent. In addition, the amount of cation incorporated into the oxidized petroleum coke based upon milliequivalents per 100 grams of product is preferably from about 1 to about 150, more preferably from about 5 to about 50. This is preferably accomplished by shaking washed oxidized petroleum coke with dilute cationic solutions, e.g., .01–5 molar of the desired cations in distilled water for one hour to about 16 hours, allowing the mixture to settle, and then filtering. To prevent unwanted ions in the product, it is preferred to prepare the dilute cationic exchange solutions from distilled water. However, pure municipal and natural water of low cation content or deionized water may be also used. Treatment with one or more dilute cationic solutions may be necessary to exchange the desired quantity and type of cations.

The cation exchange may be accomplished in an alternate manner by first neutralizing the oxidized petroleum coke with the oxides, hydroxides, bicarbonates, or carbonates of an alkali metal, alkaline earth metal, or ammonium (for example, sodium or ammonium hydroxide solutions) before treating it with the dilute salt solutions of the desired cation. By neutralizing with ammonium hydroxide, additional nitrogen in the form of ammonia may be added to the oxidized petroleum coke.

An oven heat stability test is used to evaluate the blends of low density polyethylene (LDPE), with or without uninhibited polypropylene (PP) with the above cokes. The procedure was the following. Weighted LDPE pellets were slowly poured into the gap between the two heated rolls of a 7 inch laboratory mill. After all the plastic had become molten, the PP and cation-exchanged coke were added in small increments to the molten mass. The resultant mixture was frequently removed from the rolls and fed back between the two rolls at right angles to ensure better mixing. After about 15 minutes of milling, the blend was removed from the rolls in the form of a flat sheet about 20 by 6 inches. The preferred milling conditions were:

| | |
|---|---|
| Front roll temp °F | 270 |
| Back roll temp °F | 170 |
| Roll speed ft/min | 20 |
| Take-off gap between rolls | 0.030 in |

A piece of the milled material about 3 by 7 inches and weighing about 15 g was used to mold a sheet about 10 mils thick and 6½ by 10 inches in area. The piece was placed in a rectangular 10 mil frame mold with the long dimension of each in the same direction. The sample and frame were placed between two chrome-plated steel back-up plates.

The assembly then was placed between the heated platens (320° F) of the press which were then closed in firm contact for four minutes to melt the LDPE blend. Force on the platens was raised to 25 tons gauge and held for 4 minutes. After an eight minute molding cycle the platens were separated. The assembly was removed and cooled. Several sheets were made in this way from the various LDPE blends. Strips from each sheet were cut one-half inch wide and about 2 inches long and were inserted in the vertical slots of V-shaped metal holders. These were placed in an air circulating oven at 110°C. Periodically a strip of each sample was removed from the oven and examined for degradation. This was done by bending the strip to see if it would break, by trying to tear the strip and by crunching to examine it for brittleness. All the original unheated strips were strong, they were pliable, could not be torn and were not brittle.

The results obtained by the above test with various representative blends are shown in Table I below. These results indicate that LDPE with or without 3 percent of petroleum coke is not degraded by heat. However, 3 percent of petroleum coke sulfonate loaded with 1.5 percent of copper by the ion exchange technique is instrumental in accelerating the degradation process. Example 3 shows that a mixture of 10 percent polypropylene and 90 percent polyethylene degrades rapidly relative to polyethylene itself. Adding 3 percent of the sulfonated petroleum coke containing 1.5 percent of copper is instrumental in enhancing the rate of deterioration of the blend of the two olefins.

TABLE I

[Oven heat stability tests on LDPE blends]

| | | Time, hours | | | | |
|---|---|---|---|---|---|---|
| Example | Composition | ½ | 1½ | 4 | 19 | 28 |
| 1 | 100% LDPE | | | No change, not brittle, cannot break | | |
| 2 | 0.2% Cu acetate in LDPE | | | No change | | Can tear |
| 3 | 10% PP plus 90% LDPE | | No change | Can tear with difficulty | | Can tear |
| 4 | 97% LDPE plus 3% pet. coke | | | No change | | |
| 5 | 97% LDPE plus (3% pet. coke sulfonate loaded with 1.5% Cu) | | | No change | | Can tear |
| 6 | 10% PP plus 87% LDPE plus (3% pet. coke sulfonate loaded with 1.5% Cu) [1] | No change | | Can tear | | |

[1] 0.045% copper in total blend.

TABLE II

[Weather-ometer tests on LDPE blends]

| Example | Composition | Hours | | | |
|---|---|---|---|---|---|
| | | 100 | 200 | 300 | 400 |
| 7 | 100% LDPE | No change | | | Can tear. |
| 8 | 99% LDPE plus 0.2% Cu powder | No change | | | Can tear. |
| 9 | 97% LDPE plus 3% pet. coke | No change | | | Can tear. |
| 10 | 97% LDPE plus (3% pet. coke sulfonate loaded with 1.5% Cu)[1] | No change | | | Can tear. |
| 11 | 97% LDPE plus (3% pet. coke sulfonate loaded with 1.38% Co)[2] | No change | | | Can tear. |
| 12 | 97% LDPE plus (3% pet. coke sulfonate loaded with 0.08% Cu, 1.47% Mn and 0.06% Zn). | No change | | | Can tear. |
| 13 | 10% PP plus 90% LDPE | No change | Difficult to tear. | Can tear. | Can tear easily. |
| 14 | 10% PP plus 81.4% LDPE plus 4.6% pet. coke plus 4% Texaco Green Chief Fertilizer. | No change | | | Can tear. |
| 15 | 10% PP plus 81.4% LDPE plus (4.6% pet. coke loaded with 0.08% Cu, 1.47% Mn and 0.06% Zn)[3] plus 4% Texaco Green Chief Fertilizer. | No change | Can tear | Can tear. | Can tear easily. |
| 16 | 95% LDPE plus (5% wet air oxidized pet. coke loaded with 0.7% copper)[4] | No change | | | Can tear |

[1] 0.045% Cu in total blend; [2] 0.041% Co in total blend; [3] 0.043% Mn in total blend; [4] 0.035% Cu in total blend.

Films made as described from various blends of LDPE and additives (Examples 7–16) were tested under "Sunshine" conditions in the Weather-Ometer.

For purposes of this invention, a satisfactory film was taken as one which became brittle and would tear after 300 hours of exposure to such conditions.

Blends consisting of LDPE as the major component and various other ingredients were made on the roll mill and pressed into films about 7 mils thick. The minor ingredients consisted of copper powder, petroleum coke, sulfonated petroleum coke ion exchanged with copper, sulfonated petroleum coke ion exchanged with cobalt, sulfonated petroleum coke loaded with a mixture of copper, manganese, and zinc by ion exchange, Texaco Green Chief Fertilizer, and wet air oxidized coke ion exchanged with copper. In certain of the films the polyolefin film consisted of a blend of low density polyethylene and polypropylene.

Data in Table II indicate that 3 percent of petroleum coke does not alter the degradation rate of LDPE whereas 0.2 percent of copper powder does accelerate the deterioration of the film. The LDPE film in Example 10 is blended with 3 percent of petroleum coke sulfonate containing 1.5 percent of copper and is degraded faster in the Weather-Ometer test relative to the film alone or when blended with petroleum coke. Thus the ion exchanged sulfonated coke provides both black body characteristics and accelerates degradation of the film in a clockwise manner.

Example 11 as compared to Examples 9 and 10 shows that the black opaque film containing the cobalt coke sulfonate is as effective as copper coke sulfonate in accelerating the rate of deterioration of this film and is more effective than petroleum coke in the LDPE film. In addition to providing the necessary opacity and color, the loaded coke sulfonate acts both as an absorbing agent for ultraviolet radiation, the prime degradation agent for the film and as a carrier for the selected cation that accelerates the degradation process.

In Table II, Example 12, is shown the beneficial effect to be gained by incorporating 3 percent of coke sulfonate that had been simultaneously loaded with copper, manganese, and zinc.

Example 13 shows that a 10 percent blend of polypropylene and 90% LDPE deteriorates at a faster rate than LDPE alone. Adding petroleum coke and fertilizer to the film (Example 14) did not speed the rate of decomposition; however, incorporation of the coke sulfonate containing copper, manganese, and zinc (Example 15) is effective in increasing the rate of deterioration besides providing opacity to the film.

In Example 16 a wet air oxidized petroleum coke loaded with 0.7 weight percent of copper when used with 95 percent LDPE is shown to be effective in accelerating the disintegration of the LDPE film.

The procedures used in certain of the examples in Table II are as follows:

EXAMPLE 10

A petroleum coke powdered to less than 100 mesh was sulfonated with 96 percent sulfuric acid at 200°F. The product after washing free of sulfate ion and drying was found to contain 6.51 percent sulfur.

10 grams of the above product was slurried with 1.18 grams of $CuSO_4 \cdot 5 H_2O$ in 200 ml of distilled water. The slurry was shaken for one hour and allowed to stand for 24 hours. Exchanged coke was filtered and washed with copious quantities of water. The dried coke was found to contain 1.5 percent copper.

In adjusting the compositions of Example 10, 3 percent of loaded coke from above is blended into LDPE, e.g.

$$\frac{3|1.5}{|100} = 0.045 \text{ grams of copper}$$

$$\frac{0.045|100}{100|} = 0.045\% \text{ Cu in blend}$$

thereby providing a comparison with Examples 8 and 9. The use of the coke sulfonate loaded with 1.5 percent copper and blended with 97% LDPE is shown to be effective in accelerating the degradation of LDPE compared to 3 percent of petroleum coke. The blend of coke sulfonate loaded with copper (blend 0.045 percent copper) degrades at a rate equal to the film composed of 99.8 percent of LDPE and 0.2 percent copper.

EXAMPLE 11

The petroleum coke sulfonate as produced under Example 10 was loaded with cobalt as follows: 1.32 grams $CoSO_4 \cdot 7 H_2O$ in 200 ml distilled water was added to 10 grams of the coke sulfonate. Shook the slurry one hour and allowed to stand for 24 hours. The loaded coke was filtered and washed copiously. It was found that the dried loaded coke contained 1.38 percent cobalt.

In adjusting the composition of Example 5, 3 percent of loaded coke from above is blended into LDPE, e.g.

$$\frac{3|1.38}{|100} = 0.041 \text{ grams of cobalt}$$

$$\frac{0.041}{100} \times 100 = 0.041\% \text{ Co in blend}$$

thereby providing a comparison with Examples 9 and 10. The use of coke sulfonate loaded with 1.38 percent Co and blended with 97% LDPE is shown to be effective in accelerating the degradation of LDPE compared to LDPE itself or 97 percent LDPE blended with 3 percent petroleum coke. The blend of coke sulfonate loaded with cobalt (0.041 percent cobalt) degrades at a rate equal to the film composed of 99.8 percent of LDPE and 0.2 percent copper.

EXAMPLE 12

A petroleum coke powdered to 10–25 mesh was sulfonated with 96% sulfuric acid at about 210°F. The product after washing free of sulfate ion and drying was found to contain 6.39 percent sulfur.

10 grams of the above product was slurried with 200 ml water solution of:

0.024 grams $CuSO_4$ 0.5 $H_2O$ 0.93 grams $MnSO_4$ 0.1 $H_2O$ 0.4 grams $ZnSO_4$ 0.7 $H_2O$ The slurry was shaken for 4 hours and allowed to stand for 16 hours. The exchanged coke was filtered and copiously washed and dried. The loaded coke sulfonate had the following characteristics:

| | |
|---|---|
| Copper, wt % | 0.08 |
| Manganese, wt % | 1.47 |
| Zinc, wt % | 0.06 |

The use of 3 parts of the above-loaded coke sulfonate blended with 97 parts of LDPE is shown to be effective in accelerating the degradation of LDPE compared to LDPE itself or 97% LDPE blended with 3 percent petroleum coke.

EXAMPLE 13

10% PP blended with 90% LDPE degrades more rapidly in the Weather-Ometer test than LDPE.

EXAMPLE 14

10% PP blended with 81.4% LDPE, 4 percent Texaco Green Chief Fertilizer and 4.6 percent of petroleum coke. The film did not degrade as rapidly as the 10% PP-90% LDPE mixture of Example 13.

EXAMPLE 15

Substituting the sulfonated and loaded coke used in Example 12 for the petroleum coke of Example 14 is instrumental in increasing the rate of degradation.

What we claim is:

1. An agricultural mulch comprising a polyolefin film having incorporated therein at least one additive from the group of single and multi-cation-exchanged sulfonated or wet air oxidized cokes.

2. An agricultural mulch according to claim 1 having incorporated therein from about 3 to about 20 percent of said additive.

3. An agricultural mulch according to claim 1 wherein said cation or cations are selected from the group consisting of copper, iron, manganese, zinc, cobalt, and mixtures thereof.

4. An agricultural mulch according to claim 1 comprising a mixed polyolefin film of low density polyethylene and up to 40 percent polypropylene.

5. An agricultural mulch according to claim 1 wherein fertilizers, micronutrients, fungicides, and nematocides are incorporated in the film.

6. An agricultural mulch according to claim 1 wherein said film is black.

7. An agricultural mulch according to claim 1 consisting of 97 percent of low density polyethylene and 3 percent of petroleum coke sulfonate loaded with 0.08 percent copper, 1.47 percent manganese and 0.06 percent zinc.

8. An agricultural mulch according to claim 1 consisting of 97 percent low density polyethylene and 3 percent of petroleum coke sulfonate loaded with 1.5 percent copper.

9. An agricultural mulch according to claim 1 consisting essentially of 95 percent low density polyethylene and 5 percent of wet air oxidized petroleum coke loaded with 0.7 percent of copper.

10. An agricultural mulch according to claim 1 consisting essentially of 10 percent polypropylene, 87 percent low density polyethylene and 3 percent petroleum coke sulfonate loaded with 1.5 percent copper.

* * * * *